(12) United States Patent
Mo

(10) Patent No.: US 8,094,649 B2
(45) Date of Patent: Jan. 10, 2012

(54) NETWORK ARCHITECTURE AND BILLING METHOD OF THE PACKET SWITCH DATA SERVICE FOR THE CDMA INTELLIGENT NETWORK (IN) USERS

(75) Inventor: Jiajun Mo, Shanghai (CN)

(73) Assignee: Alcatel Lucent, Paris (FR)

( * ) Notice: Subject to any disclaimer, the term of this patent is extended or adjusted under 35 U.S.C. 154(b) by 2060 days.

(21) Appl. No.: 10/941,995

(22) Filed: Sep. 16, 2004

(65) Prior Publication Data

US 2005/0063346 A1   Mar. 24, 2005

(30) Foreign Application Priority Data

Sep. 18, 2003   (CN) .................................. 03151053

(51) Int. Cl.
*H04L 12/66* (2006.01)
(52) U.S. Cl. ......... 370/352; 370/353; 370/354; 370/401
(58) Field of Classification Search .................. 370/352, 370/353, 354, 355, 395.2, 401, 402; 455/406, 455/408; 379/114.28, 115.01, 126, 127.01
See application file for complete search history.

(56) References Cited

U.S. PATENT DOCUMENTS

| | | | |
|---|---|---|---|
| 7,113,997 B2 * | 9/2006 | Jayapalan et al. | ............ 709/229 |
| 2001/0039191 A1 * | 11/2001 | Maierhofer | .................... 455/466 |
| 2006/0050680 A1 * | 3/2006 | Naim et al. | .................... 370/352 |
| 2007/0217581 A1 * | 9/2007 | Dai et al. | .................. 379/114.2 |

FOREIGN PATENT DOCUMENTS

WO   02/17561 A2   2/2002

* cited by examiner

*Primary Examiner* — Jean Gelin
(74) *Attorney, Agent, or Firm* — Sughrue Mion, PLLC

(57) ABSTRACT

The present invention relates to the network architecture and billing method of the packet switch data service of the CDMA Intelligent Network (IN) user. Because the CDMA mobile switch uses the 3G1x packet switch data service, the billing of the service bypasses the MSC calling control layer, the billing can only be implemented by the PCF. In the PCF, there are only two billing methods: by amount of data method and the post service method. The non-real time post billing methods are not suitable for the IN prepaid users. Thus, the present invention illustrates new network architecture and billing method of the packet switch data service. The billing interface (PCF-SCP) is provided between the PCF and the SCP. The billing interface transfers at least three messages between the PCF and the SCP, to implement the real time or periodic billing for packet switch data service.

7 Claims, 3 Drawing Sheets

NETWORK ARCHITECTURE AND BILLING METHOD OF THE PACKET SWITCH DATA SERVICE FOR THE CDMA INTELLIGENT NETWORK (IN) USERS

CROSS-REFERENCE TO RELATED APPLICATION(S)

This application is based on the Chinese Patent Application No. 03151053.1 filed on Sep. 18, 2003, the disclosure of which is hereby incorporated by reference thereto in its entirety, and the priority of which is hereby claimed under 35 U.S.C. §119.

FIELD OF THE INVENTION

The present invention relates to the CDMA 3G1x packet switch data service, in particular, this invention relates to the network architecture and billing method of the packet switch data service.

BACKGROUND OF THE INVENTION

The packet switch data service is a very important service of 3GPP2. The advanced functions, such as accessing the network in mobile environment, can be achieved for users. Because the data switch of the service does not go through the Mobile Switch Center (MSC) and the Service Control Point (SCP), its speed exceeds the limitation, 64 k, of the conventional time-gap switch. In the data packet switch service, the data transmission bypasses the switch center. The Mobile Station (MS) exchanges the data with Packet Data Service Network (PDSN) directly through the Base Station Center (BSC) and the Packet Control Function (PCF). The MSC and SCP only authorize the user, i.e. the MSC and SCP only check whether the user is allowed to use the data service and whether the balance in the account is enough for continuing the calling function. However, the data stream of data service goes through the path, MS<->BSC<->PCF<->PDSN.

After CDMA mobile switch uses the 3G1x packet switch data service, the billing of the service bypasses the MSC calling control layer, therefore, billing can only be implemented by the PCF. In the PCF, there are currently two billing methods, by amount of data and post service. None of them are real time billing methods. They might be suitable for the normal CDMA users, but not suitable for the IN prepaid users. Because the balance on the account of the IN prepaid users are stored on the SCP, the PCF cannot charge the users in real time. Therefore, the current network architecture of the packet switch data service is not suitable for billing the prepaid user. Otherwise, it is very likely to cause deficits on the accounts, which will lead to loss for carriers and end users. However, IN service and data service are indeed the star services with competitive strength in the CDMA market, and the difficulty of unifying the method of billing for the two services will block the development of CDMA data services.

SUMMARY OF THE INVENTION

For resolving this issue, which is that the IN pre-paid users cannot be charged real time when they use packet switch data service, the present invention presents a new network architecture and method of the packet switch data service. Then, the CDMA IN users (including the normal users and prepaid users) can use the packet switch data service with accurate billing.

The present invention is implemented by the following elements: a CDMA IN user network architecture of packet switch data service and a billing interface. The network architecture comprises a MSC and a SCP, which authorize users; and a BSC, a PCF and a PDSN, through which the MS exchanges the data. The billing interface (PCF-SCP) is provided between the PCF and the SCP. Based on the protocol stack of the application layer, the billing interface is defined. The PCF has the same protocol as that of the SCP for supporting the message transmission between each other and implementing the real time or periodic billing for packet switch data service.

The billing interface includes at least three messages used in charging that are: the Connect message sent from the PCF to the SCP, the Connect Return Result message returned from SCP to PCF, and the Disconnect message sent from the PCF to the SCP.

In the network architecture described above, the method using billing interface for billing the packet switch data service comprises the following steps:

after the successful connection of data service is ensured by the PCF, it should send a Connect message to the SCP through the billing interface for formally notifying the SCP of the connect event;

the SCP returns the Connect Return Result message through the billing interface, and returns the integrative message with the balance, which can be used by the prepaid user, to the PCF; if it is not a prepaid IN user, the SCP does not send the balance to the PCF, but instead sends default value;

c. the PCF controls the calling by the balance information;

d. the connection is setup between the MS and the packet switch data service network e. the MS exchanges the data with the PDSN;

f. after the data service transmission ends, the release message is sent from the MS side;

g. the BSC notifies the MSC to release;

h. the BSC notifies the MSC to release;

the PCF sends the Disconnect message to the SCP through the billing interface, and then sends the information of the amount of money used and the reason for disconnection to the SCP, and the SCP charges the user in real time. If the user is not a prepaid IN user, the PCF sends the information of the amount of money used of the un-prepaid user and the reason for disconnection to the SCP, then, the SCP logs it and bills it in a predefined time span.

wherein, in the above step c, the PCF, which controls the calling by the balance information, further comprising:

the PCF monitors the balance in real time, when the balance is not enough, the steps d-i will not be preformed, the PCF sends the release message to the BSC side directly;

the BSC notifies the MS to release;

the BSC notifies the MSC to release;

the PCF sends Disconnect message to the SCP, and sends the information of the amount of money used and the reason for disconnection to the SCP together.

The present invention presents a new billing interface (PCF-SCP), the definition of which makes the packet switch data network architecture more integrated for covering the more complex service requirements. The issue of the billing method of an IN user is resolved by the interface, which can cause all CDMA users to support the packet switch service. It is the technical basis for higher market share of the data service. And, the setup of the interface makes a more integrated model of message flow and network architecture. The extended definition of the interface will cover the new services, which may be derived from the current services.

BRIEF DESCRIPTION ON THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Hereinafter, the detailed descriptions will be illustrated by the preferred embodiments and the figures.

Figure 1:
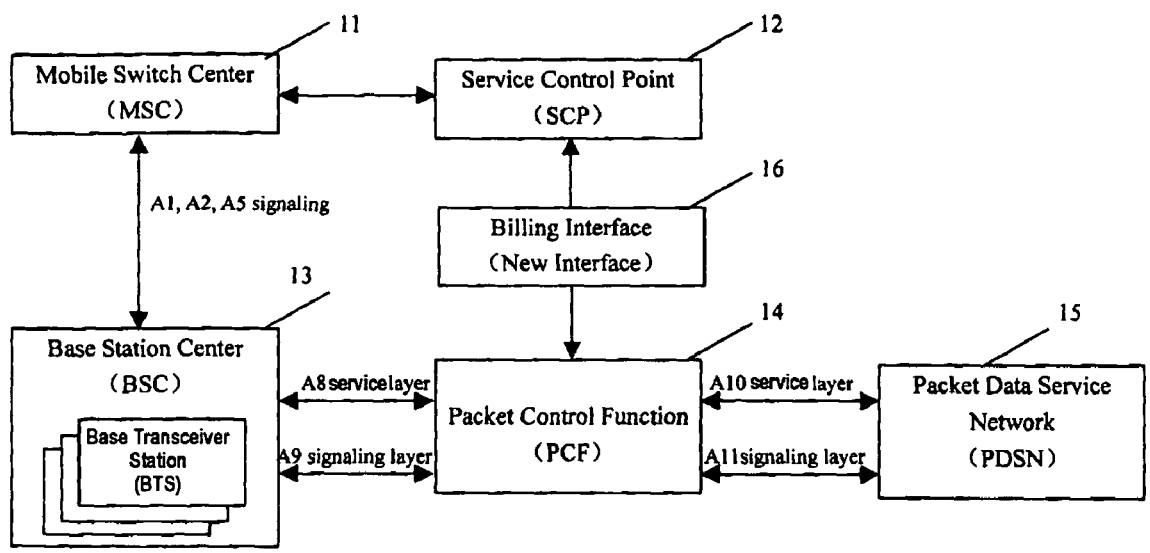
FIG. 1 is the block diagram of the network architecture of the packet switch data service for the CDMA IN user.

As shown in FIG. 1, the network architecture of the packet switch data service for the CDMA IN user comprises: the MSC 11 and the SCP 12, which authorize users; the BSC 13, the PCF 14 and the PDSN 15, through which the MS exchanges the data. The billing interface 16 (PCF-SCP) is provided between the PCF 14 and the SCP 12.

Figure 2:
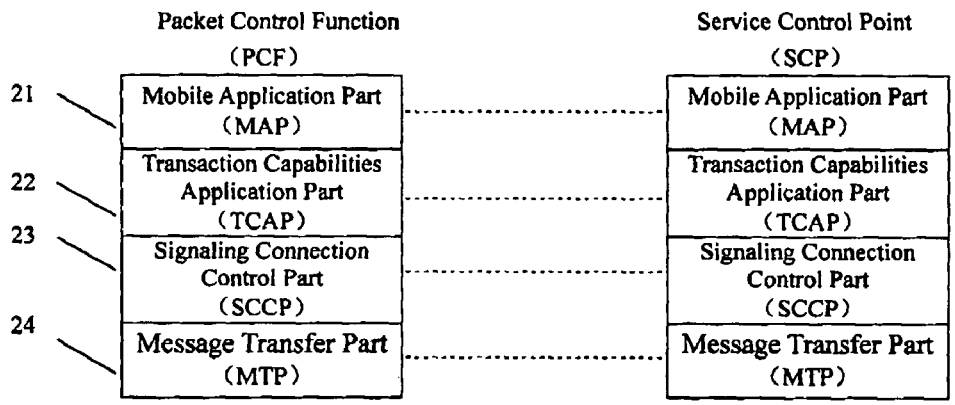
FIG. 2 is the model of the protocol stack of the PCF-SCP billing interface.

In the embodiment shown in FIG. 2, the billing interface 16 may be defined based on the MAP 21 (Mobile Application Part) as the protocol stack of the application layer. The application layer protocol is not the only option. It can show a better feasibility of the interface. We can certainly use other kinds of application layer protocol, such as TCP/IP protocol or signaling system 7 and so on. The purpose of using the protocol stack is for maintaining the consistency with the protocol used by current CDMA network as much as possible. The PCF and the SCP have the same corresponding protocol stack, which can support the message transmission between each other to affect the sending and receiving of message.

Further, as shown in FIG. 2, the protocol stacks of the PCF and SCP comprise Message Transfer Part (MTP) layer 24, Signaling Connection Control Part (SCCP) layer 23, and Transaction Capabilities Application Part (TCAP) layer 22. For the PCF and the SCP, generally, the packing and unpacking only happen in the application layer.

Figure 3:
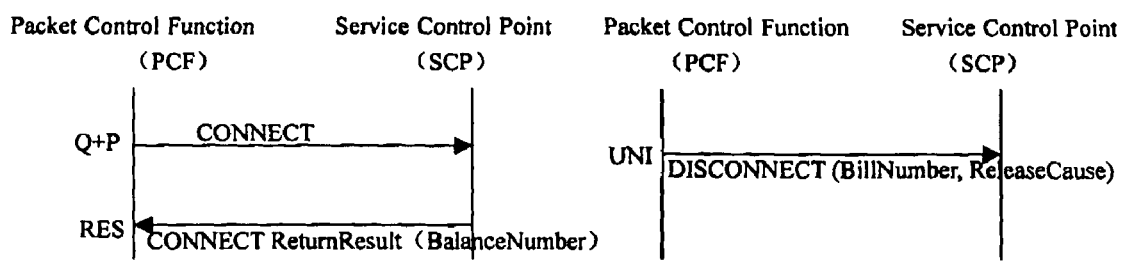
FIG. 3 is the message definition flow of the PCF-SCP billing interface.

As shown in FIG. 3, the message flow in the billing interface 16 includes at least three messages that are used for charging. They are (1) the Connect message, which belongs to Query With Permission (Q+P) message type, sent from the PCF to the SCP, (2) the Connect Return Result message, which belongs to Response (RES) message type, returned from the SCP to the PCF and (3) the Disconnect message, which belongs to the Unidirectional (UNI) message type sent from the PCF to the SCP.

The parameters are defined according to the protocol MAP, however, the definition is not unique. But please beware of conflicts between the new message and parameter definition and the existing extended standard. All message and parameter definition can be referred to the TIA/EIA-41-D standard, the definition of the messages and parameters in this embodiment are listed as follow.

A: Message Definition

The following table shows the new message: the definition of the parameter Connect

| CONNECT INVOKE Parameters Timer: 15 s | | | |
|---|---|---|---|
| Field | Value | Type | Reference |
| Identifier | SET | M | 100 |
| Length | Variable Octers | M | |
| Contents | | Type | Reference |
| Mobile Directory Number (MDN) | | M | 6.5.2.80 |

Explanation of Parameter:

Mobile Directory Number (MDN): shows the user who will be charged

2. The following table shows the new message: the definition of parameter Connect Return Result

| CONNECT RETURN RESULT Parameters | | | |
|---|---|---|---|
| Field | Value | Type | Reference |
| Identifier | SET | M | 101 |
| Length | Variable Octers | M | |
| Contents | | Type | Reference |
| Mobile Directory Number (MDN) | | M | 6.5.2.80 |
| Balance Number | | M | Need new definition |

Explanation of Parameters:

Mobile Directory Number (MDN): user identification number, which shows the user to be charged Balance Number: balance on account comprising 6 digits, the first 4 digits present the amount before the decimal point, and the last 2 digits present the amount after the decimal point. The unit is Yuan.

3. The following table shows the new message: the definition of parameter Disconnect

| DISCONNECT INVOKE Parameters Timer: None | | | |
|---|---|---|---|
| Field | Value | Type | Reference |
| Identifier | SET | M | 102 |
| Length | Variable Octers | M | |
| Contents | | | |
| Mobile Directory Number (MDN): | | M | 6.5.2.80 |
| Bill Number | | M | Need new definition |
| Release Cause | | M | 6.5.2.el |

Explanation of Parameters:

Mobile Directory Number (MDN): user identification number, which shows the user to be charged BillNumber: the amount used by the user. It is defined as comprising 6 digits, the first 4 digits present the amount before the decimal point, and the last 2 digits present the amount after the decimal point. The unit is Yuan.

ReleaseCause: the cause of Call release.

B: Paramater Definition

The parameters, Mobile Directory Number (MDN) and Release Cause, have been defined in IS826 standard. It is listed here for your convenience.

The following table shows the new message: the definition of parameter Mobile Directory Number (MDN):

| Field | Value | Type | Reference |
|---|---|---|---|
| Identifier | Mobile Directory Number (MDN): | M | 6.5.1.2 |
| Length | Variable Octers | M | 6.5.1.2 |

| Contents | | | | | | | | |
|---|---|---|---|---|---|---|---|---|
| 8 bits | 7 bits | 6 bits | 5 bits | 4 bits | 3 bits | 2 bits | 1 bit | Byte (octet) |
| Type of digits | | | | | | | | The 1st byte |
| Nature of number | | | | | | | | The 2nd byte |
| Numbering Plan | | | | | Encoding | | | The 3rd byte |
| Number of Digits | | | | | | | | The 4th byte |
| The 2nd BCD code | | | | The 1st BCD code | | | | The 5th byte |
| The 4th BCD code | | | | The 3rd BCD code | | | | The 6th byte |
| ... | | | | ... | | | | ... |
| The nth BCD code | | | | The n − 1th BCD code | | | | The mth byte |

2. The following table shows the new message: the definition of parameter Release Cause:

| Field | Value | Type | Reference |
|---|---|---|---|
| Identifier | ReleaseCause | M | 6.5.1.2 |
| Length | 1 | M | 6.5.1.2 |

| Contents | | | | | | | | |
|---|---|---|---|---|---|---|---|---|
| 8 bits | 7 bits | 6 bits | 5 bits | 4 bits | 3 bits | 2 bits | 1 bit | Byte(octet) |
| Release Cause | | | | | | | | The 1st byte |

Value=1: the phone is hung up on the calling side, the call is released

Value=2: the phone is hung up on the called side, it means that the break circuit release is sent by the PCF, it is usually caused by insufficient money.

3. The following table shows the new message: the definition of parameter BalanceNumber:

| Field | Value | Type | Reference |
|---|---|---|---|
| Identifier | Balance Number | M | 9FFF35 |
| Length | 3 | M | |

| Contents | | | | | | | | |
|---|---|---|---|---|---|---|---|---|
| 8 bits | 7 bits | 6 bits | 5 bits | 4 bits | 3 bits | 2 bits | 1 bit | Byte(octet) |
| The 2nd BCD code | | | | The 1st BCD code | | | | The 1st byte |
| The 4th BCD code | | | | The 3rd BCD code | | | | The 2nd byte |
| The 6th BCD code | | | | The 5th BCD code | | | | The 3rd byte |

4. the following table shows the new message, BillNumber, parameter definition:

| Field | Value | Type | Reference |
|---|---|---|---|
| Identifier | Bill Number | M | 9FFF36 |
| Length | 3 | M | |

| Contents | | | | | | | | |
|---|---|---|---|---|---|---|---|---|
| 8 bits | 7 bits | 6 bits | 5 bits | 4 bits | 3 bits | 2 bits | 1 bit | Byte(octet) |
| The 2nd BCD code | | | | The 1st BCD code | | | | The 1st byte |
| The 4th BCD code | | | | The 3rd BCD code | | | | The 2nd byte |
| The 6th BCD code | | | | The 5th BCD code | | | | The 3rd byte |

Figure 4:
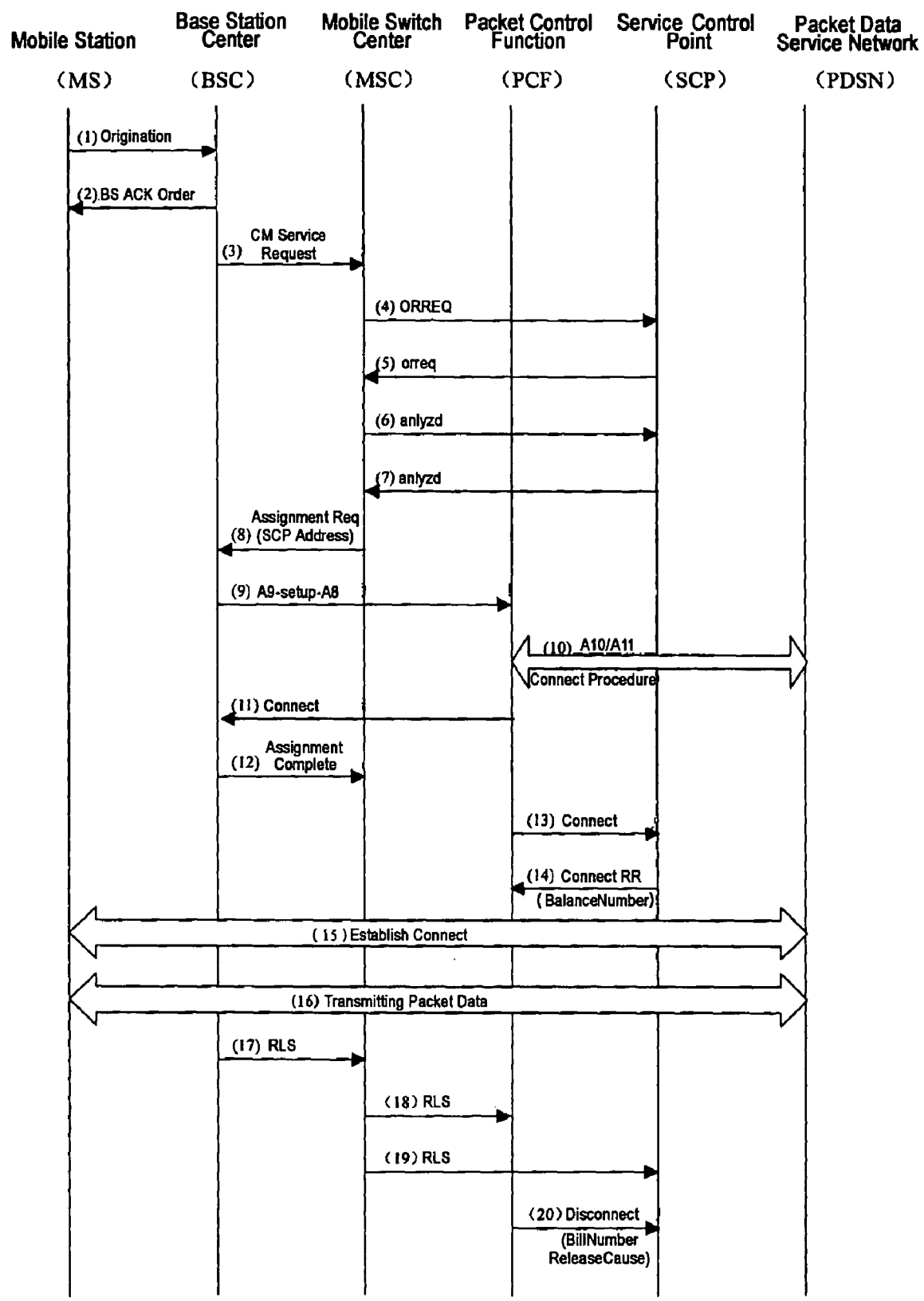
FIG. 4 is the calling and billing flow of the packet switch data service for the CDMA IN users after the new interface is added.

After the messages and parameters are defined, the billing service of the packet switch data service can be performed by the PCF-SCP billing interface. FIG. 4 shows the calling and billing flow of the packet switch data service for the users of the CDMA IN with the new interface added. The flow is as follow:

Origination: request from the MS

BS ACK Order: the BSC responds after it receives the request.

CM Service Request: the BSC sends request to the MSC.

ORREQ: the MSC sends start calling request after necessary checks.

orreq: the SCP responds the request anlyzd: the MSC asks the SCP to performing service check analysis.

anlyzd: if the SCP permits the user using the packet switch data service, the calling is allowed.

Assignment Req (SCP Address): the MSC sends the channel on air assignment request, the SCP address is sent from the MSC to the BSC, and the message is sent to the PCF through the BSC.

Setup: the A8, A9 signal and service channel connections are setup between the BSC and the PCF.

A10/A11 Connect Procedure: the PCF and the PDSN setup the A10 and A11 signal and service channel connection.

Connect: the acknowledge message is setup between the BSC and the PCF.

Assignment Complete: the BSC notifies the MSC that the connection is ending, mobile switch quits calling the control layer.

Connect: after the PCF ensures that connection of the data service is successful, the Connect message should be sent to the SCP through the billing interface for formally notifying the SCP of the connect event.

Connect Return Result: the SCP returns the Connect Return Result message and the message containing the information of the balance on the user account to the PCF through the billing interface, if the user is not the prepaid IN user, the message of balance is not sent, and the default value is sent instead. Thus, the PCF can control calling by information about the balance.

Establish Connect: the connection is setup between the MS and the PDSN.

Transmitting Packet Data: data are exchanged between the MS and the PDSN.

When the MS sends the release request:

(17) RLS: after transmission of the data service ends, the release message is sent from the MS side.

(18) RLS: the BSC notifies the MSC to release.

(19) RLS: the BSC notifies the PCF to release.

(20) Disconnect: the PCF should send the Disconnect message to the SCP through the billing interface, and send the amount of money used and the reason for disconnection to the SCP so that the SCP is permitted to charge the user in real time.

Figure 5:
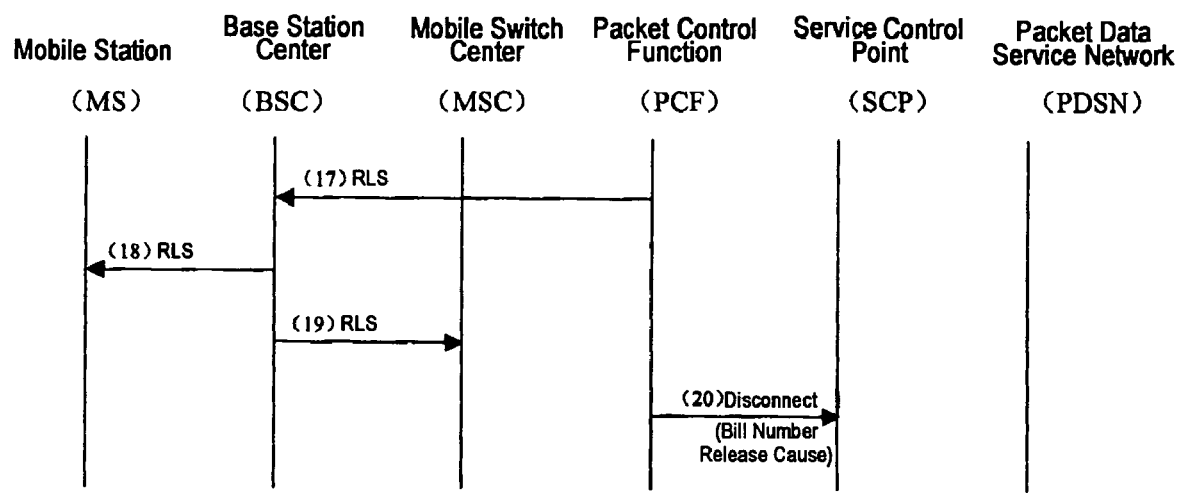
FIG. 5 is the flow of the PCF releasing the data service packet switch when the balance on the account is insufficiency.

FIG. 5 shows the status of releasing when the PCF detects that the use's balance is insufficient; the previous connection and billing processes, i.e. the step of message (1) to message (16) are same as shown in FIG. 4.

(17) RLS: when the balance is insufficient, the PCF can detect the situation, and sends the release message to the BSC side.

(18) RLS: the BSC notifies the MS to release.

(19) RLS: the BSC notifies the MSC to release

(20) Disconnect: the PCF sends the Disconnect message containing the amount of money used and the reason for releasing to the SCP through the billing interface.

As shown from the above description, the new billing interface solution resloves the billing issue of the packet switch data service of the IN user. As can be understood, the embodiments shown and described above just explain the principle of the present invention.

Those of skill in the art will appreciate that changes can be made to the disclosed embodiments without departing from the scope of the invention as defined in the following claims.

What is claimed is:

1. A network architecture of a packet switch data service of a CDMA Intelligent Network (IN) user, said architecture comprising:
   a Mobile Switch Center (MSC) and a Service Control Point (SCP) for authorizing users;
   a Base Station Center (BSC), a Packet Control Function (PCF) and a Packet Data Service Network (PDSN), wherein said MSC carrying out data exchanges; and
   wherein a billing interface (PCF-SCP) is provided between said PCF and said SCP.

2. The architecture according to claim 1, wherein said billing interface processes at least three messages for a toll computation, said three messages including a Connect message sent from the PCF to the SCP, a Connect Return Result message returned from the SCP to the PCF and a Disconnect message sent from the PCF to the SCP.

3. The architecture according to claim 1, wherein said billing interface is defined based on the protocol stack of an application layer, and said PCF and said SCP have the same corresponding protocol stack provided for supporting a message transmission between each other and implementing real time or periodic billing for packet switch data service.

4. A billing method implemented in a network architecture of a packet switch data service, said network architecture including a Mobile Switch Center (MSC) and a Service Control Point (SCP) for authorizing users, a Base Station Center (BSC), a Packet Control Function (PCF) and a Packet Data Service Network (PDSN), and a billing interface (PCF-SCP) between said PCF and said SCP, said method comprising the steps of:
   a. the PCF, after ensuring that the connection of data service is successful, sending a Connect message to the SCP through the billing interface for formally notifying the SCP of the connection of data service;
   b. the SCP returning a Connect Return Result message through the billing interface, and then sending the balance on the account of the prepaid user, which is integrated within said Connect Return Result message to the PCF;
   c. the PCF controlling calling by the balance information;
   d. setting up the connection between the MS and the packet switch data service network;
   e. the MS exchanging data with the PDSN;
   f. after data service transmission ends, sending the release message from the MS side;
   g. the BSC notifying the MSC to release;
   h. the BSC notifying the MSC to release; and
   i. the PCF sending a Disconnect message to the SCP through the billing interface, and sending an amount of money used and the reason for disconnection to the SCP, the SCP charging the user in real time.

5. The method according to claim 4 wherein said step c wherein the PCF controls calling by the balance information, further comprising the steps of:
   i. the PCF monitoring the balance in realtime, and when the balance is not enough, steps d-i will not be preformed, and the PCF sends the release information to the BSC side directly;
   ii. the BSC notifying the MS to release;
   iii. the BSC notifying the MSC to release;
   iv. the PCF sending a Disconnect message to the SCP, and sending the amount of money used and the reason for disconnection to the SCP together.

6. The method according to claim 4 wherein in said step b, if the user is not a prepaid IN user, the SCP does not send the balance to the PCF, but sends a default value.

7. The method according to claim 4 wherein in said step i, if the user is not a prepaid N user, the PCF sends the amount of money used by the un-prepaid user and the reason for disconnection to the SCP, then, the SCP logs it and bills it in predefined time span.

* * * * *